US005379141A

United States Patent [19]
Thompson et al.

[11] Patent Number: 5,379,141
[45] Date of Patent: Jan. 3, 1995

[54] METHOD AND APPARATUS FOR TRANSMITTING BROADBAND AMPLITUDE MODULATED RADIO FREQUENCY SIGNALS OVER OPTICAL LINKS

[75] Inventors: Leo Thompson, Lilburn; Frank Little, Alpharetta; Rezin E. Pidgeon, Jr., Atlanta, all of Ga.

[73] Assignee: Scientific-Atlanta, Inc., Norcorss, Ga.

[21] Appl. No.: 998,208

[22] Filed: Dec. 30, 1992

Related U.S. Application Data

[62] Division of Ser. No. 446,461, Dec. 4, 1989, Pat. No. 5,191,459.

[51] Int. Cl.$^6$ .............................................. H04J 14/02
[52] U.S. Cl. .................................. 359/125; 359/132; 359/195
[58] Field of Search ...................... 359/124–125, 359/132–133, 188, 190–191, 195; 358/86; 455/6.1, 313

[56] References Cited

U.S. PATENT DOCUMENTS

| 3,535,640 | 10/1970 | Forrest, Jr. | 358/86 |
| 3,704,419 | 11/1972 | Rheinfelder | 325/306 |
| 4,525,835 | 5/1983 | Schenkel et al. | 370/3 |
| 4,545,075 | 10/1985 | Miller et al. | 155/612 |
| 4,709,418 | 11/1987 | Fox et al. | 455/612 |
| 4,748,689 | 5/1988 | Mohr | 455/612 |
| 4,891,694 | 1/1990 | Way | 358/86 |
| 4,949,170 | 8/1990 | Yanagidaira et al. | 358/86 |
| 4,953,156 | 8/1990 | Olshansky et al. | 359/132 |
| 4,959,862 | 9/1990 | Davidov et al. | 380/10 |
| 5,016,242 | 5/1991 | Tang | 359/124 |
| 5,153,763 | 10/1992 | Pidgeon | 359/125 |
| 5,191,459 | 3/1993 | Thompson et al. | 359/133 |

FOREIGN PATENT DOCUMENTS 0100037  5/1987  Japan .................................. 359/133

OTHER PUBLICATIONS

"The Broward Cable Area Network Fiber Model" in Communications, Engineering and Design; pp. 27–40 (Feb. 1989).
Pidgeon et al., "Performance of AM Multi-Channel Fiber Optical Links" (May 21–24, 1989).
M. F. Mesiya, "Design of Multi-Channel Analog Fiber Optic Transmission Systems".
L. Stark, "AM Transmission on Fiber" in Communications, Engineering and Design; pp. 20–34 (Apr. 1988).
Bertelmeir and Zshunke, "Linearization for Broad-band Optical Transmission Systems by Adaptive Predistortion"; Frequenze 38, pp. 206–212 (1984).
K. Asatani & T. Kimura, "Linearization of LED Nonlinearity by Predistortions", IEEE Transactions on Electron Devices, vol. ED-25, No. 2, pp. 207–212 (Feb. 1978).
Proceedings on Fiber Optics Seminar, SCTE, (Jan. 18–20, 1988).
Tucker, "A Two Phase Telecommunications System", Electronic Engineering, pp. 192–197 (Jun. 1948).

(List continued on next page.)

Primary Examiner—Herbert Goldstein
Assistant Examiner—K. Negash
Attorney, Agent, or Firm—Banner, Birch, McKie & Beckett

[57] ABSTRACT

An optical communications system including a plurality of modulated radio frequency carriers which span more than an octave in bandwidth. In one implementation, the carriers are grouped into ranges which span less than an octave in bandwidth and the individual groups are transmitted over unique optical links. In another implementation, the groups are multiplexed on one optical link by using different wavelengths. In still another implementation, several of the bands are up-converted to the highest band of interest and then transmitted, either over single or multiple links. The resulting optical signals are demodulated and then down-converted before they are recombined into the broadband signal in excess of an octave in bandwidth.

12 Claims, 12 Drawing Sheets

OTHER PUBLICATIONS

Olshansky, "60 Channel FM Video Subscriber Multiplexed Optical Communications System", Electronic Letters, vol. 23, No. 22, pp. 1196–1198 (Oct. 22, 1987).

Handouts distributed Jan. 18–20, 1988 at meeting of Society of Cable Television Engineering.

S. D. Personic, "Fiber Optics", Plenum Press, pp. 195–224 (1985).

James A. Chiddix & David M. Pangrec, "Fiber Backbone: A Proposal for an Evolutionary CATV Network Architecture", NCTA Technical Papers, pp. 73–82 (1988).

Herman Gysel, "Composite Triple Beat and Noise in a Fiber Optic Link Using Laser Diodes", NCTA Technical Papers, pp. 94–101 (1988).

Perry Rogan et al., "A Technical Analysis of a Hybrid Fiber/Coaxial Cable Television System", NCTA Technical Papers, pp. 83–93 (1988).

"LightWave-The Journal of Fiber Optics", pp. 1, 4, 8–10, and 27–35 (Apr. 1988).

"LightWave-The Journal of Fiber Optics", pp. 1 and 7–9 (Nov. 1988).

"LightWave-The Journal of Fiber Optics", pp. 1 and 6–8, 2, 7, and 8 (Jan. 1989).

R. A. Luff, Commmunications, Engineering and Design pp. 35–36 (Feb. 1989).

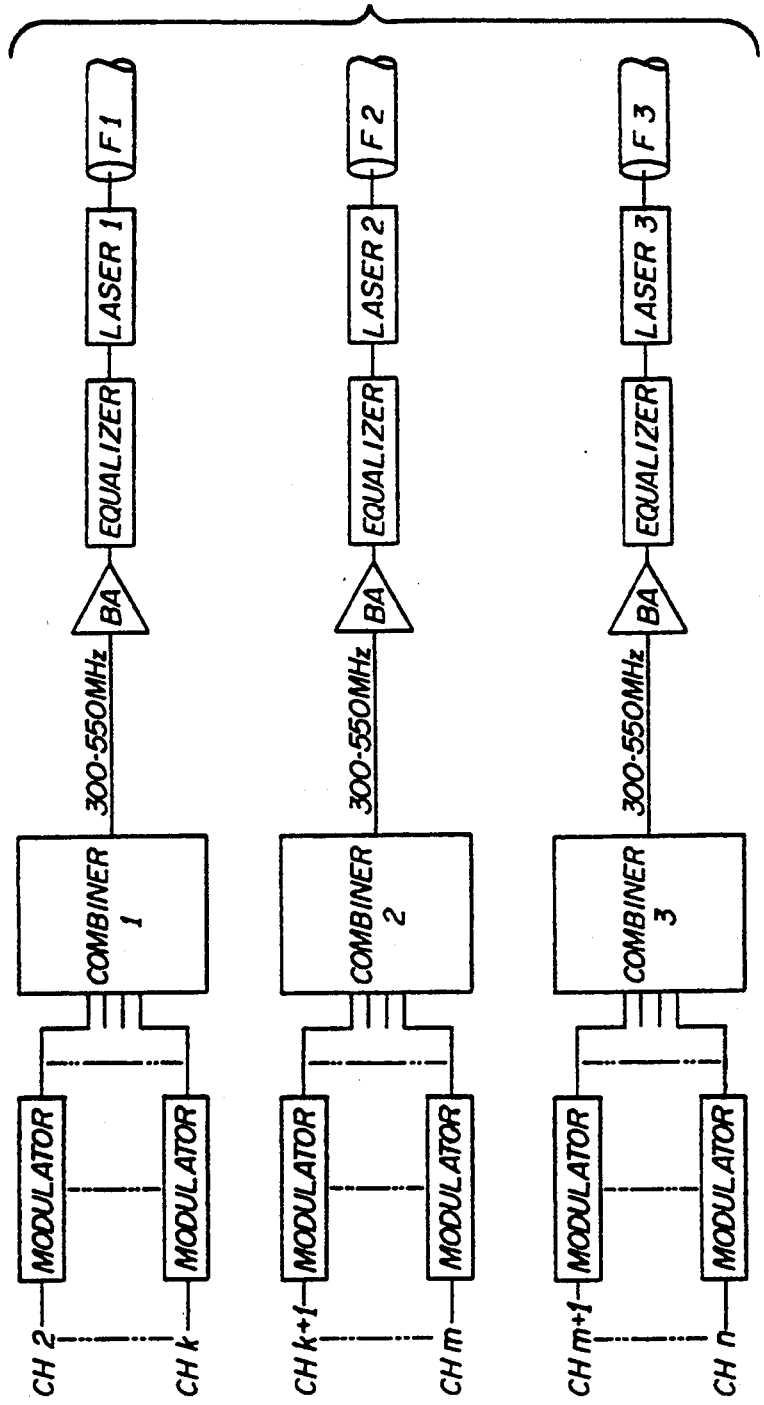
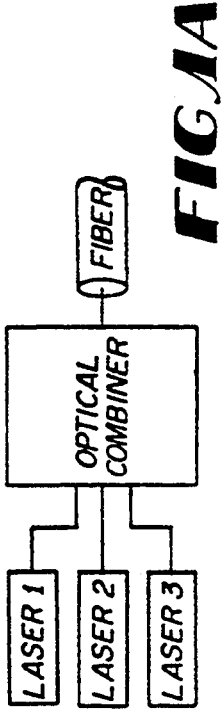

ORIGINAL

REVERSE CASCADE 2 AMPS 2 NODES

RF BYPASS CASCADE 2 AMPS 4 NODES

RF BYPASS CASCADE 4 AMPS 2 NODES

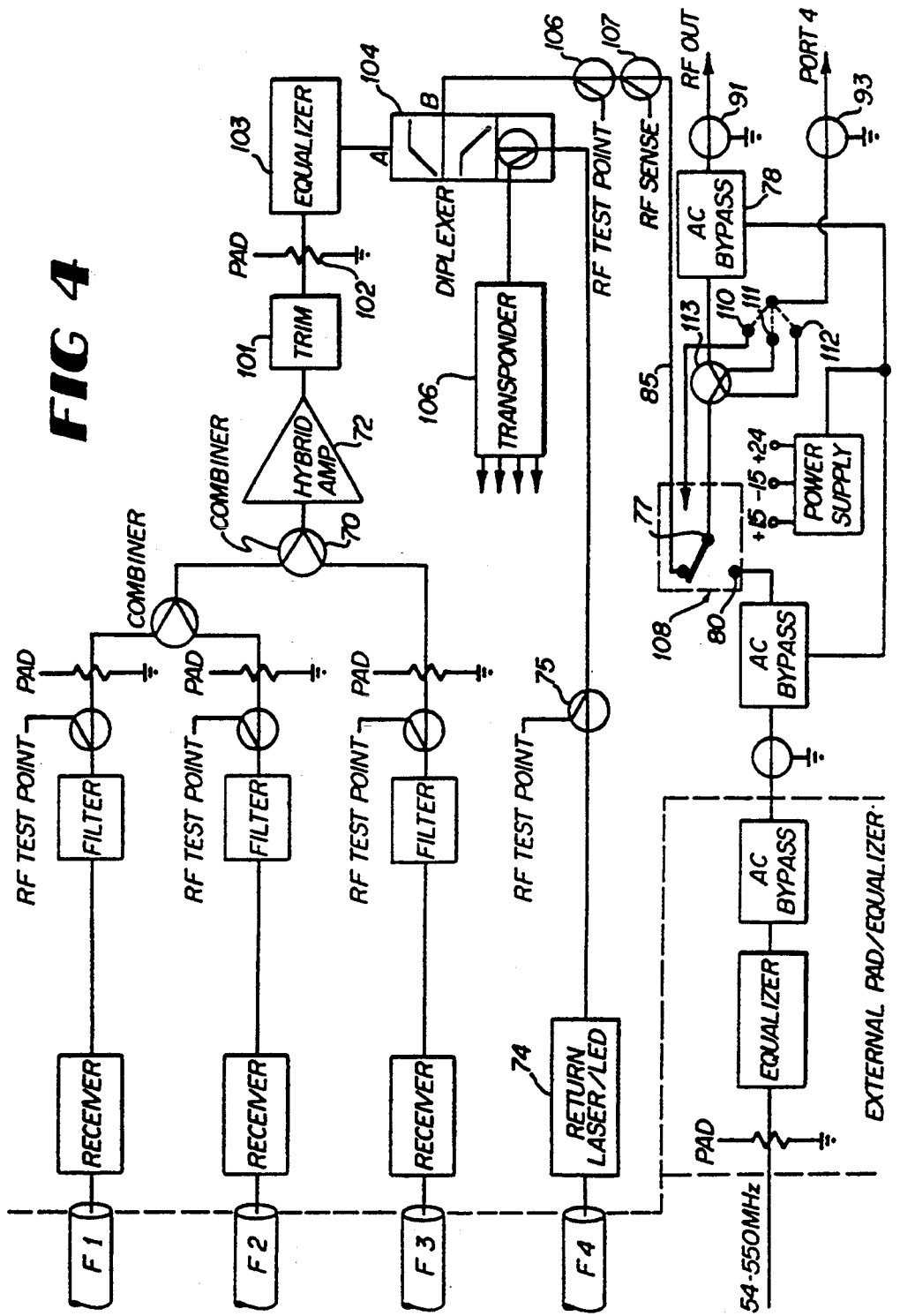

METHOD AND APPARATUS FOR TRANSMITTING BROADBAND AMPLITUDE MODULATED RADIO FREQUENCY SIGNALS OVER OPTICAL LINKS

This is division, of application Ser. No. 07/446,461, filed Dec. 4, 1989 now U.S. Pat. No. 5,197,459.

FIELD OF INVENTION

The present invention relates to optical signal transmission systems and more particularly to a system for transmitting a broadband of radio frequency channels covering more than an octave of bandwidth over an optical link wherein the radio frequencies are amplitude modulated onto the optical signals transmitted over the link.

Background of the Invention

In recent years there has been a great deal of interest in the transmission of various types of information television signals via optical fiber. Presently, most CATV systems for distributing television signals operate by modulating the video, audio, and other information for each television channel onto a respective radio frequency carrier signal. Each of these carrier signals typically has a bandwidth of 6 MHz (4.5 MHz of information and a 1.5 MHz guard band). A plurality of these signals covering a broadband of radio frequencies (e.g., in the range of 54–550 MHz) are distributed via networks comprising 75 ohm coaxial cables and appropriate signal amplifiers and taps.

Optical fibers intrinsically have more information carrying capacity than do the coaxial cables which are used in present CATV systems. In addition, optical fibers are subject to less signal attenuation per unit length than are coaxial cables adapted for carrying radio frequency signals. Consequently, optical fibers are capable of spanning longer distances between signals regenerators or amplifiers than are coaxial cables. In addition, the dielectric nature of optical fiber eliminates the possibility of signal outages caused by electrical shorting or radio frequency pickup. Finally, optical fiber is immune to ambient electromagnetic interference ("EMI") and generates no EMI of its own.

A number of means are available for transmitting television signals and or other types of information over optical fibers or other optical transmission media. For example, the 6 MHz baseband television signal may be converted to digital form. This digital information may be used to modulate a light signal and transmitted via an optical link. Transmission of such a digitized 6 MHz video signal requires a digital data transmission rate of at least 45 megabits per second. High definition video ("HDTV") may require a digital data transmission rate of up to 145 megabits per second. Moreover, encoders and decoders for converting analog television signals to digital form and for reconverting these digital signals to analog form for viewing on a conventional television set are quite expensive. Consequently, analog transmission of television signals by optical means is, potentially, much more economical than digital transmission of such signals.

One such means of analog transmission is to use a baseband television signal to frequency modulate a radio frequency carrier. This modulated radio frequency carrier is in turn used to modulate an optical signal. Such frequency modulation, is less susceptible to noise than is amplitude modulation, but it requires more bandwidth for each television channel transmitted than is required by amplitude modulation. Thus, the number of television channels which can be carried by each optical transmission link (e.g., each optical fiber) in an FM-based system may be somewhat limited. Moreover, since the standard NTSC format for video calls for amplitude modulation of the video carrier, means for converting FM signals to NTSC AM format are required either at the television set or at the point at which the fiber transmission trunk is connected to a coaxial cable distribution network. The need for such FM to NTSC AM conversion increases the cost of the system.

In view of the above, a system in which the video baseband signal amplitude modulates a radio frequency carrier signal which in turn amplitude modulates an optical signal is preferable to other systems from the standpoint of cost and simplicity. However, several phenomena limit the number of radio frequency channels which can be carried by present day optical links where the intensity of light signals is amplitude modulated. A first of these phenomena is a limitation of the amount of radio frequency energy which may be supplied as a modulating signal to a laser or other light generating device before various types of distortions are generated by the light generating device. This power limitation relates to the sum of the radio frequency power contributions of each radio frequency channel. Thus, if it were desired to transmit 80 radio frequency channels over a single optical link, each of these channels could be powered with only half of the power which would be available if only 40 channels were to be transmitted by the link. Such a limitation on the power of each radio frequency carrier brings each of these carriers closer to the white noise level of the system, and thus, adversely affects the signal to noise ratio of the system. Decreasing the number of channels carried by each optical link in order to improve the signal to noise ratio increases the number of lasers which must be used and the overall complexity and cost of the system. On the other hand, trying to increase the amount of radio frequency power supplied to the laser beyond certain limits causes the laser to produce several types of distortion which are discussed below.

When the modulating signal supplied to a laser causes the laser to be driven into a nonlinear portion of its input-signal-to-light-output characteristic, harmonic distortion may be produced. The products of this type of distortion are signals which are integer multiples of the "primary" frequency. The second harmonic of 54 MHz is, for example, 108 MHz. Thus, if the bandwidth accommodated by a system is such that there are channels at both 54 MHz and 108 MHz, second harmonics of the 54 MHz channel will interfere with the signals on the 108 MHz channel.

Intermodulation distortion is of particular concern in amplitude modulated systems. Such distortion results in distortion products having frequencies which are the sum or difference between two other frequencies. The sum and difference of two primary frequencies are called second order distortion products and are particularly troublesome. For example, a video channel at 150 MHz and another video channel at 204 MHz may produce a second order distortion product at 54 MHz (the difference frequency) and at 354 MHz (the sum frequency). Third order distortion products are produced by the mixing of a primary frequency and a second order distortion product producing third order distortion products equal to the sum and difference between the primary frequency and the second order distortion product. Third order products may also be generated by the mixing of three frequencies or by the third harmonic generation of a primary frequency.

Several methods have been proposed to alleviate the problems caused by harmonic distortion and intermodulation distortion in amplitude modulated optical links. One such method is described in U.S. Pat. No. 5,153,763 to Pidgeon, which is assigned to the Assignee of the present application. In accordance with the method described in the above application, distortion of a broadband CATV signal is reduced by translating the of the signal to a higher frequency range at which the bandwidth signal constitutes less than an octave. This translated broadband signal is applied as an radio frequency modulating signal to an optical signal generating device (e.g., a laser or laser diode) and transmitted over an optical link (e.g., a fiber optical path) to an optical receiver and demodulator at a remote location. After demodulation radio frequency signals outside the band of interest (e.g., harmonics and intermodulation distortion products) are filtered out by a bandpass filter having a passband covering only the frequencies of interest. The passband is then reconverted to the original frequency range (e.g., 54 to 550 MHz) and is available for distribution to subscribers of conventional CATV components.

One deficiency of the above method is that the processes of "up-conversion" and subsequent "down-conversion" may themselves introduce noise and/or distortion into the system.

SUMMARY OF THE INVENTION

In accordance with the present invention, a method has been found to limit the bandwidth of radio frequency signals used to modulate light emitting sources used in a broadband CATV distribution network to less than an octave. The method is implemented using a minimum number of optical links and does not require block up-conversion of the entire frequency band of interest to a higher band of frequencies and block down-conversion to the original band, although such block conversion may be utilized for some of the lower frequency channels in the frequency band of interest as set forth below.

To implement the invention, a plurality of radio frequency channels covering more than one octave of bandwidth are separated into two or more groups of contiguous channels, each of such groups occupying less than one octave of frequency. For example, a first group of channels may occupy the 54 MHz to 106 MHz band (just under one octave). Similarly, a second band of channels may occupy the 108 MHz to 214 MHz band. Optionally, additional groups of frequencies may occupy the bands of 214 MHz through 426 MHz and 426 MHz through 850 MHz. Each of these sub-bands, constituting a group of radio frequency channels, is used to modulate the intensity of the output of a respective light emitting device such as a laser. Each resulting amplitude modulated light signal is transmitted over a corresponding optical link to the receiving location. Each of these optical links may be, for example, a single strand of optical fiber.

Alternatively, each of the lasers may be selected to generate light of different wavelengths than the other lasers and all of the laser outputs may be transmitted over a single optical fiber or other physical light transmitting means. In this latter case, at the receiving node, each wavelength is separated by a wavelength division demultiplexer and sent to individual receivers. At the receiving location, each of the optical signals is received and demodulated by a respective individual receiver. The demodulated radio frequency signal produced by each of these receivers may be passed through a frequency selective or bandpass filter which serves to alleviate harmonic and/or intermodulation distortions and/or noise produced in the optical transmission system. Each of the resulting radio frequency signals may then be suitably attenuated so as to match the amplitude of the other radio frequency signals before being applied to combiner and trim circuitry to combine the sub-bands of frequencies back into a single broadband radio frequency signal. This resulting broadband radio frequency signal may be operated on by additional circuitry which serves to alleviate any discontinuities of the signal at the transitions between the sub-bands.

It will be noted that in the above system, far fewer 6 MHz channels can be accommodated by the optical links serving the lower frequency sub-bands than by the optical links accommodating the higher frequency sub-bands since there is room for fewer 6 MHz channels in a lower frequency octave. In accordance with one aspect of the invention, the number of optical links required to implement the above system may be reduced by initially modulating all of the baseband television signals onto radio frequency carrier frequencies in the highest sub-band of interest (e.g., in the range of 330 to 550 MHz). Because of the separation of signals provided by multiple optical links, the same carrier frequency may be utilized on each of the links to carry a channel of baseband video information. At the receive side, one of the demodulated signals must be down-converted to a lower frequency range so as not to interfere with the signals from the other optical channels when the two signals are mixed. However, this solution involves only one down-conversion for only a portion or portions of the frequency band of interest. Moreover, since the method does not require up-conversion for any of the channels, it is believed to introduce far less distortion and noise to the transmission system than the previous methods of block converting all of the channels to a higher frequency and then reconverting all channels to their original frequencies.

It is an object of the present invention, therefore, to provide a method for generating and receiving light signals modulated with broadband radio frequency signals in a manner which maximizes the signal to noise ratio of the received radio frequency signals.

It is a further object of the invention to minimize harmonic and intermodulation distortion products introduced by the optical transmission system into the radio frequency signals.

It is still a further object of the invention to accomplish the reduction of the intermodulation and harmonic distortion products in a manner which minimizes the number of optical signal paths necessary for transmission of a given number of radio frequency signals. It is yet a further object of the invention to achieve a reduction in the number of optical signal paths or links necessary to transmit a given number of baseband television channels without converting all the carrier frequencies of the television channels to respective higher frequencies.

BRIEF DESCRIPTION OF THE DRAWINGS

The above and further objects and advantages of the invention will become apparent with reference to the detailed disclosure of the invention set forth below and the accompanying illustrative figures in which:

FIG. 1 is a block diagram of a headend optical transmitter for a system operating in accordance with the present invention;

FIG. 1A is another embodiment of a headend optical transmitter for a system operating in accordance with the present invention;

FIG. 4 is a block diagram of an alternative embodiment of an optoelectronic receiver node operating in accordance with the present invention;

DETAILED DESCRIPTION OF THE INVENTION

Figure 2A:
FIGS. 2(a)-2(d) are block diagrams illustrating how optoelectronic nodes may be connected in an existing CATV system to provide an interface between optical signal paths and a previously existing coaxial cable network.

Referring now to FIG. 1, there is shown an illustrative embodiment of a CATV headend configured in accordance with the invention. At this headend there exists a number of channels of information (channel 2 through channel n) to transmit through the CATV network fed by the headend. In this illustrative example the channels are television channels which occupy 6 MHz of bandwidth at baseband (4.5 MHz of video, audio and other information and a 1.5 MHz guard band). It will be appreciated, however, that the present invention would be equally applicable for the transmission of any type of information through a network. Each of the baseband channels of information is supplied to a respective modulator of the type normally found at CATV headend installations (e.g., a Scientific Atlanta Model 6350). Each modulator serves to impose the baseband channel on a radio frequency carrier supplied by the modulator. Standard plug-in modulators are in common use at CATV headends which can produce modulated radio frequency signals in the range of, for example, 54 through 550 MHz and higher, in 6 MHz increments. In the conventional CATV systems in use today, each baseband signal must be modulated onto a carrier frequency which is distinct from carrier frequencies associated with any other baseband signal since all of the carrier frequencies must be mixed together to form a single broadband signal for transmission over a coaxial cable network wherein the trunk and distribution links of the network comprise a single 75 ohm coaxial cable path. In accordance with present invention, however, several optical links may be used to replace or supplement portions of a trunk of a CATV system. This type of system is also generally described in U.S. Pat. No. 5,153,763 to Pidgeon, which is assigned to the assignee of the present application. In view of the plurality of optical links employed, a baseband signal transmitted over one link may, if desired, be modulated onto a radio frequency carrier having the same frequency as the carrier of a baseband signal transmitted over a different link.

Thus, as shown in FIG. 1, a first group of baseband signals designated as channels 2 through k may be fed to a first group of modulators having carrier frequencies in, for example, the 300 to 550 MHz range. Similarly, a second group of baseband signals designated as channels k+1 through m may be fed respectively to a second group of modulators which may, optionally, have the same or some of the same carrier frequencies as the first group of modulators. Finally a third group of baseband signals designated as channels m+1 through n may be fed to their respective group of modulators which may also have carrier frequencies in the same range as the modulators of the first two groups (e.g., 300-550 MHz). It will be noted that if each of the group of baseband signals is modulated with the highest possible set of carrier frequencies within the radio frequency band of interest, a maximum number of channels may be accommodated in a single signal path while maintaining the total bandwidth of the group of channels within less than an octave range. As discussed above, this objective of keeping the bandwidth below an octave is important in order to minimize problems associated with intermodulation distortion and harmonic distortion produced when the radio frequency signal is used to amplitude modulate the light output of a light emitting device such as a laser. It is particularly noteworthy, that the present invention achieves this objective without resorting to up conversion of one or more groups of modulated radio frequency signals since such up conversion can cause degradation and distortion of the signals upon which it operates.

In the illustrative example set forth herein three groups of baseband signals are designated. It will be appreciated that the invention is equally applicable to systems in which two groups of baseband signals or greater than three groups are defined. In the illustrative embodiment of FIG. 1, each of the three groups of baseband signals are combined into respective broadband signals in the range of 300-500 MHz by respective signal combiners 1, 2, and 3. Each of these broadband radio frequency signals may be passed through respective buffer amplifiers and equalizers in order to provide equivalent signals to amplitude modulate the light output of respective lasers 1, 2, and 3. In the illustrative embodiment of FIG. 1, each of the lasers 1, 2, and 3 may emit light of the same wavelength since their respective optical outputs are transmitted through the network over individual fiber optic links F1, F2, and F3. Separate physical links for transmitting the respective optical signals are not necessary to practice the present invention however. Alternatively referring to FIG. 1a the lasers 1, 2, and 3 may each be selected to emit light of a unique wavelength. The three amplitude modulated optical signals may then be combined in an optical combiner device and transmitted over a single fiber strand or other type of optical link.

FIG. 2 shows the manner in which an optical signal transmission network may be interfaced with an existing coaxial CATV network so as to complement the existing network.

FIG. 2a shows a portion of an existing network consisting of a cascade of trunk amplifiers.

Figure 2B:
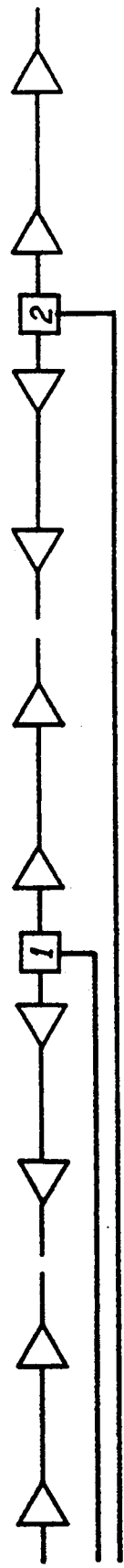

FIG. 2b shows an interfacing scheme called a reverse cascade in which two nodes or interfaces between the optical electronic systems are utilized to feed signals carried by the trunk to forward and reverse cascades of amplifiers. It will noted that in this configuration it is required to reverse the direction of some of the existing amplifiers in the CATV system.

Figure 2C:
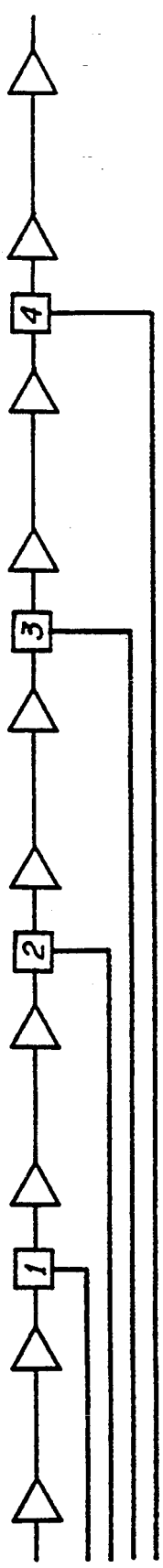

FIG. 2c shows a system in which the optical signal transmission system bypasses portions of the existing CATV trunk. In this system each node receives both an optical signal and an radio frequency signal from the cascade of trunk amplifiers between the node and the headend of the system.

Figure 2D:
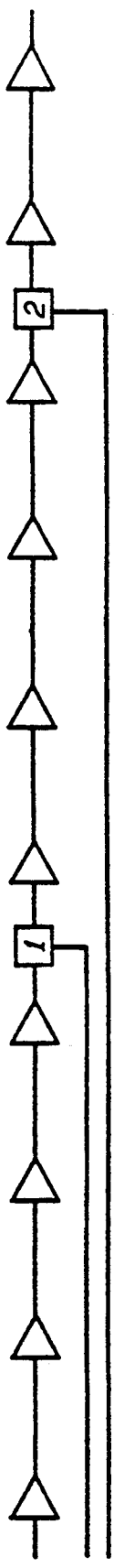

FIG. 2d shows a system similar to the system set forth in FIG. 2c which requires one-half the number of nodes. The question of whether the system of FIG. 2c is more or less reliable than the system of FIG. 2d depends in great part of the reliability of the node circuitry. Thus, if the node circuitry is relatively reliable compared to trunk amplifier circuitry, the circuitry of FIG. 2c may be more reliable on a system from a system standpoint. On the other hand, if the node circuitry proves to be relatively unreliable when compared with the trunk amplifier circuitry or the likelihood that the existing coaxial trunk system will suffer outages for other reasons, the network illustrated by FIG. 2d will tend to have a better system reliability.

Figure 3:
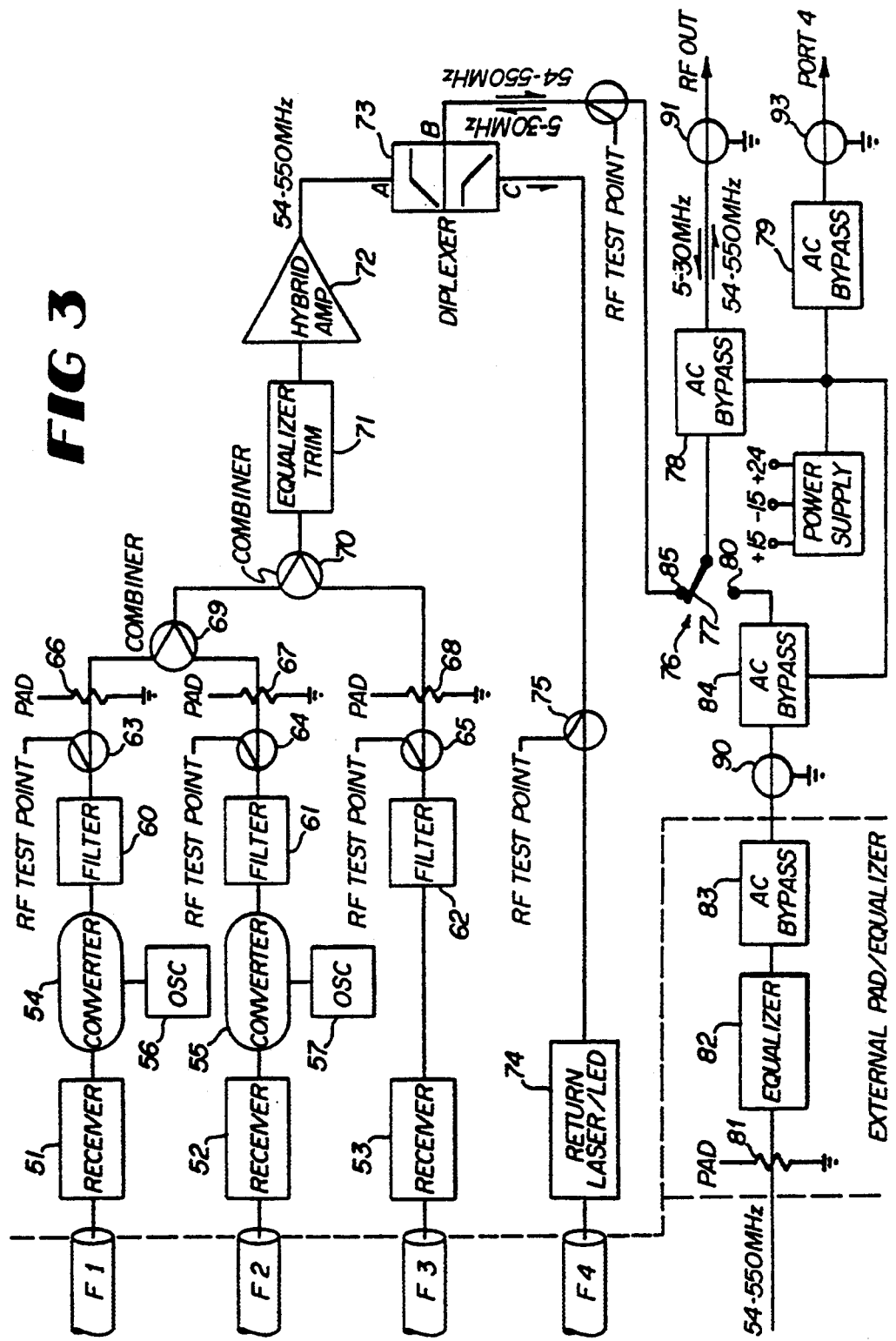
FIG. 3 is a block diagram of an optoelectronic receiver node for a system operating in accordance with the present invention.

FIG. 3 illustrates an embodiment of a node which is adapted to serve as an interface between an existing coaxial signal distribution system and an optical signal distribution system such as is set forth in FIG. 1. The node circuitry set forth in FIG. 3 is particularly adapted for nodes operating in accordance with the requirements of the systems illustrated in FIGS. 2c and 2d.

Referring to FIG. 1, it will be noted that the amplitudes of the light signals are modulated with radio frequency carriers and the radio frequency carriers are themselves modulated with video or other types of information. The modulated light signals are delivered to the node via optical fiber strands F1, F2, and F3. In this connection it should be noted that the node of FIG. 3 is equally applicable to a system in which only one physical fiber strand delivers multiple optical signals having different wave lengths to the node. In this case, the optical signals delivered by the single fiber may be physically separated by optical means to enable each optical signal to be conveyed to a corresponding optical signal receiver/demodulator.

In either of the above cases, each amplitude modulated optical signal is provided as an input to a corresponding optical receiver/demodulator. In the illustrative embodiment of FIG. 3, optical receivers 51, 52, and 53 serve this purpose. These receivers may be any type of receiver which has characteristics which are suitably linear to adapt it to serve as a device for demodulating an analog radio frequency signal from an amplitude modulated light beam. Once such type of receiver is called a high impedance receiver and another type of receiver suitable for this purpose is a transimpedance receiver. Both of these types of receivers are discussed in U.S. Pat. No. 4,998,012 to Kruse which is assigned to the assignee of this application. A type of receiver which is particularly adapted to implement receivers 51, 52, and 53 is the receiver described in U.S. patent application Ser. No. 07/481,436 entitled "Push-Pull Optical Receiver" which is also assigned to the assignee of the present application. In addition to the above receivers a number of other types of optoelectronic receivers are currently available.

Figure 8:
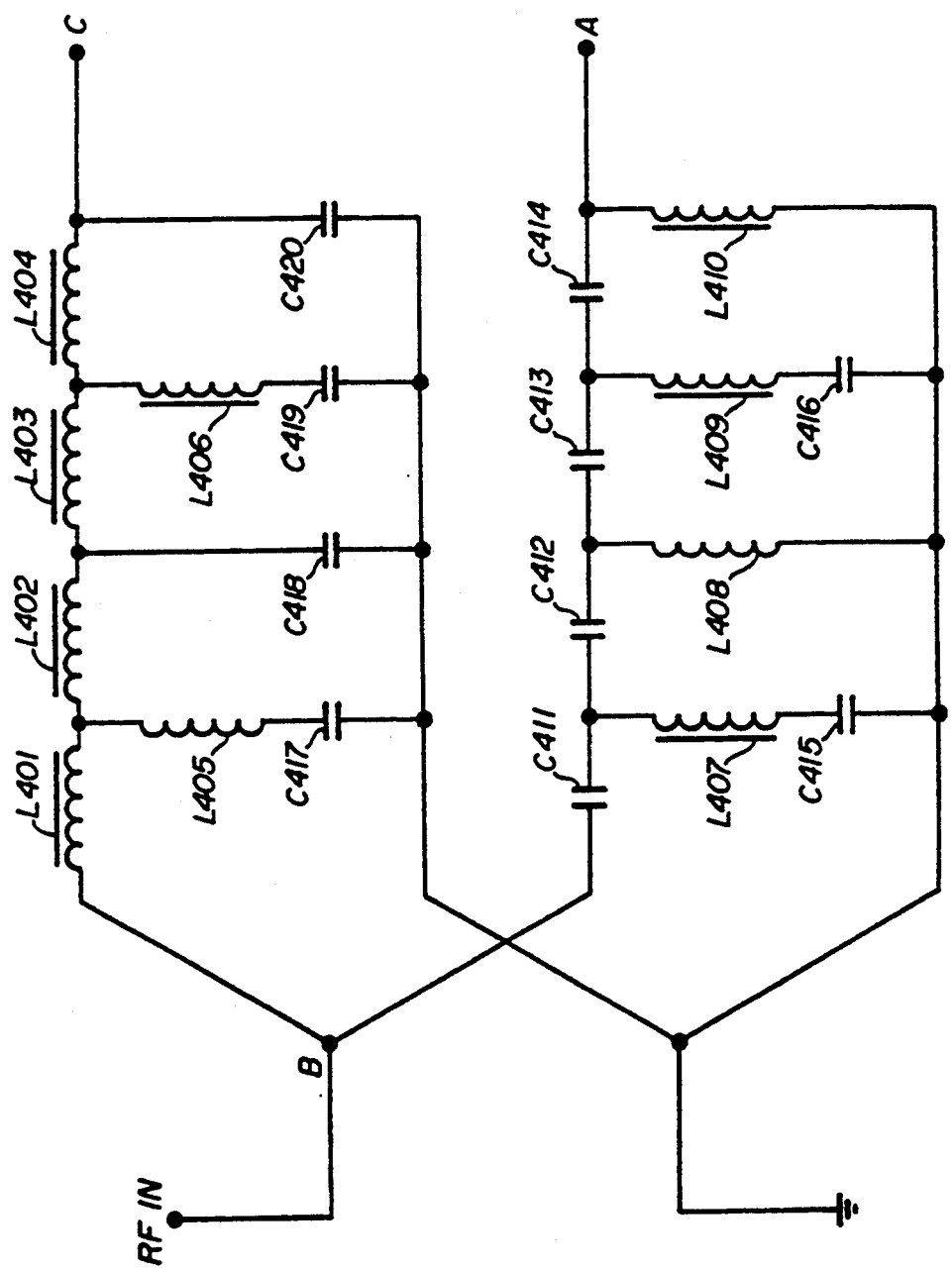
FIG. 8 is a schematic diagram of a diplex filter which may be incorporated in the receiver node of the present invention.

One or more of the receivers 51, 52, or 53 may feed down-converters such as down converters 54 and 55 if the band of radio frequency carriers assigned to these receivers overlaps with the bands of radio frequency carriers assigned to another receiver such as receiver 53. It will be recalled that in the illustrative signal transmitter illustrated by FIG. 1, the radio frequency carriers carried by optical links F1, F2, and F3 were all in the range of 300–550 MHz so as to maximize the number of channels which could be carried by the link and still contain the channels of each link within one octave. Assuming that the transmitter of FIG. 1 feeds the receivers of FIG. 3, it will be necessary for suitable oscillators 56 and 57 to feed converters 54 and 55 so as to down-convert or up-convert the radio frequency signals at the-outputs of receivers 51 and 52 so that they do not overlap the frequency band at the output of receiver 53 or with each other. The outputs of receivers 51 and 52 and their respective optional down converters 54 and 55 are connected respectively to filter circuits 60 and 61. The output of receiver 53 is connected to filter 62. Each of these filters is designed to attenuate frequencies outside of the frequency band of interest on a particular signal path. Circuits for presently preferred embodiments of these filters are discussed in more detail on connection with the discussion of 5a through 5h below. Each of the filters 60, 61, and 62 is connected to a respective radio frequency test point 63, 64 or 65. These radio frequency test points are directional couplers which are described in greater detail in connection with the discussion of FIG. 5 below. The radio frequency test points 63, 64, and 65 are in turn connected to Pads 66, 67, and 68 which are of conventional design. Pads 66 and 67 are connected to a combiner 69 and the output of the combiner 69 and of the Pad 68 are connected to a combiner 70. The output of this combiner 70 is connected to an equalizer trim circuit 71 which in turn feeds a hybrid amplifier 72. The output of the hybrid amplifier feeds a diplexer or diplex filter 73, illustrative circuitry for which is illustrated in FIG. 8. The diplex filter in turn feeds a return laser or LED 74 via a test point 75. The common output of the diplex filter 73 goes to a relay 76. The common point 77 of the relay is connected to a 75 ohm radio frequency output port of the node via an AC bypass circuit 78 and to another port of the node via another AC bypass circuit 79. When the common arm 77 of the relay is in its other position 80 the optical signal path is bypassed and the radio frequency output port is connected to an radio frequency input port via a Pad 81, an equalizer 82, and an AC bypass circuit 83 and 84.

The operation of the circuitry described above is as follows. Filters 60, 61, and 62 are set up to roll off noise and distortion products outside the band of interest of their respective receivers 51, 52, and 53. In a typical arrangement receiver 51 and down converter 54 will produce about 6 MHz radio frequency video carrier channels beginning at channel 2 beginning at 54 MHz.

The receiver 52 and down-converter 55 may accommodate the next 30 radio frequency channels in the frequency band and the remainder of the channels would be handled by receiver 53. In such a configuration, filter 60 would be a low pass filter allowing only the frequencies up to and including the highest frequency channel in the frequency band of interest to pass. Filter 61 would be of the band-pass variety, attenuating noise and distortion at frequencies above and below the band of interest. Filter 62 would be a high pass filter allowing all frequencies above the lowest frequency channel of the band of interest through. Alternatively a two-path system is possible utilizing only optical links F1 and F2. In such a system, approximately one-half of the channels are accommodated by each of the receivers 51 and 52. Here filter 60 would be a low pass filter with a break point at about 330 MHz and filter 61 would be a high pass filter with a similar break point.

The respective filters 60, 61, and 62 feed combiners 69 and 70 through test points 63, 64, and 65 and Pads 66, 67, and 68. The pads are pluggable units which are selected to equalize the amplitude of the signals fed to the inputs of combiners 69 and 70. The attenuation required of each pads may be determined by monitoring the outputs of filters 60, 61, and 62 via radio frequency test points 63, 64, and 65.

Figure 9A:
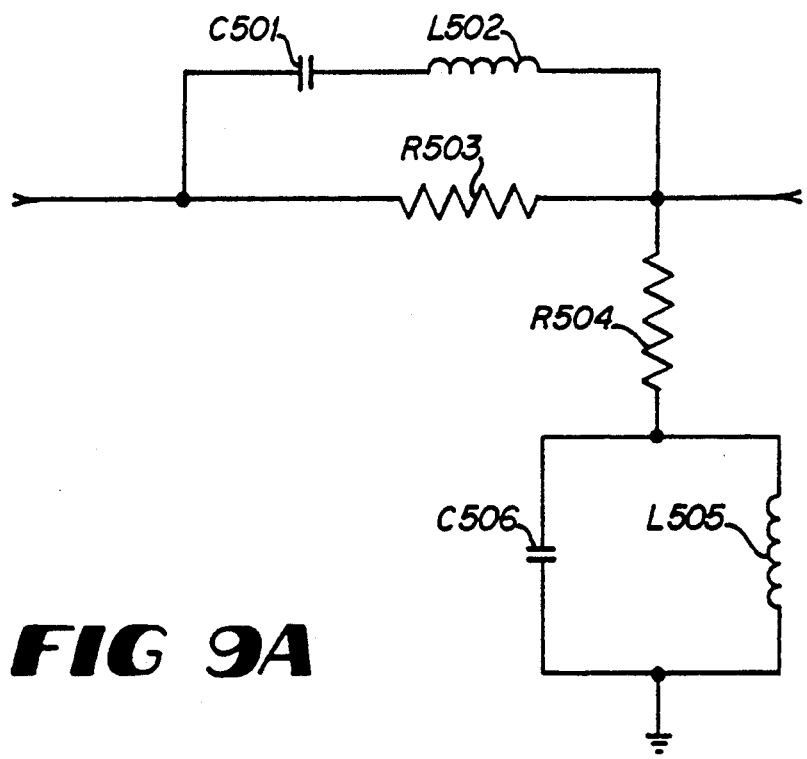
FIGS. 9a and 9b are schematic diagrams of presently preferred receiver trimmers (frequency signature correction networks) for use in the present invention for equalizing radio frequency carrier amplitudes at the outputs of the receiver modes.
Figure 9B:
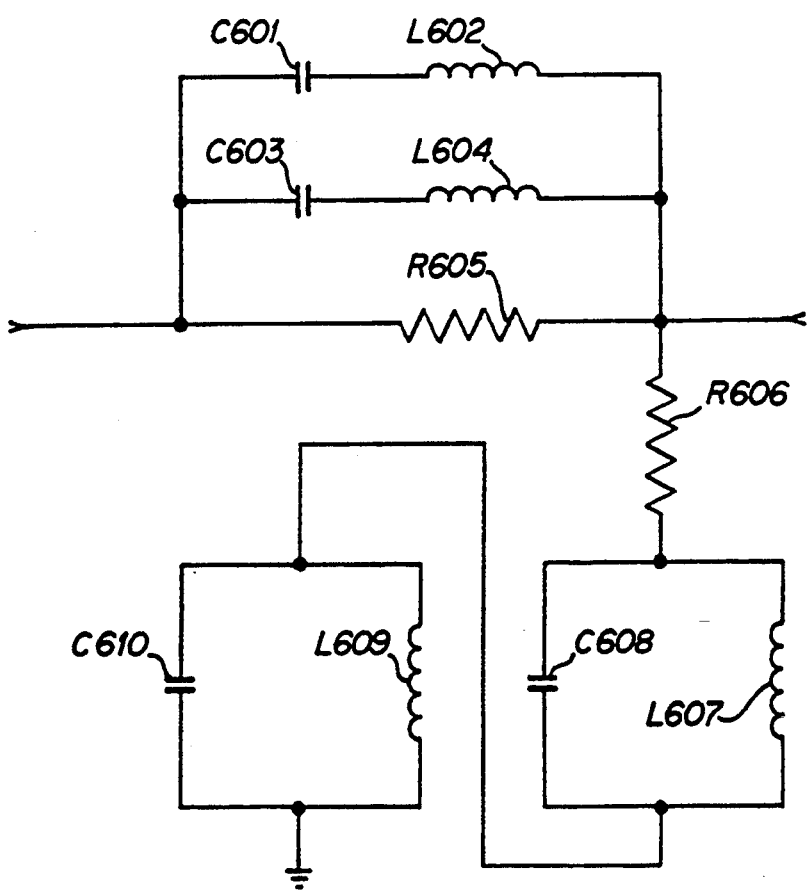

The purpose of the equalizer trim circuit 74 is to flatten out the output signal from combiner 70. In this regard two types of adjustments may be required to the signal. Firstly, the signal from the combiner may be "tilted." That is, there may be differences between the amplitudes of the higher frequency signals and lower frequency signals which vary across the frequency band in a linear manner. Secondly, at certain points in the frequency and, especially at frequencies at the interfaces between the sub-bands carried by the various optical links, there may be notches in the response wherein some channels or group of channels have a higher or lower amplitude than the channels surrounding them. It is desireable to smooth out these notches or peaks in the frequency response. FIG. 9a illustrates a presently preferred embodiment of a equalizer trim circuit which is particularly adapted for systems utilizing two optical links. FIG. 9b illustrates a presently preferred embodiment of a circuit particularly adapted to provide equalizer trim in a system with three optical links.

In the presently preferred embodiment of the invention, the equalizer trim circuit 71 feeds a hybrid amplifier 72 such as a Motorola Model SHW 571.

At this point it should be noted that in many coaxial CATV systems, television signals are transmitted from the headend to subscriber locations in a frequency band of 54–550 MHz. Some systems also have the capability of transmitting signals from subscriber locations back to the headend. In most such systems, these return signals are carried in a frequency band ranging from about 5 to 30 MHz. Referring to FIG. 3, the output of the hybrid amplifier 72 feeds a 54–550 MHz broadband signal into port A of the diplexer 73. This signal exits the diplexer 73 at port B thereby passing through the relay 76 and the AC bypass 78 to the radio frequency output. It will be noted that a return signal in the band of 5–30 MHz enters the node from the radio frequency output, passes through the AC bypass and the relay 76 and enters the diplexer 73 at its port B. This signal exits the diplexer 73 at port C and is supplied to the return laser or LED 74 where it modulates the optical signal generated by this device. This modulated optical signal may be transmitted back to the headend of the system via the optical link F4 which may, for example, be an additional fiber optical strand.

It should also be noted that the relay 77 is conditioned to go to its other position when a problem occurs in signal transmission along the optical path. Under these conditions the broadband 54–550 MHz signal enters the node through radio frequency input port 90 via AC bypass 83, equalizer 82, and a Pad 81. The signal is routed through relay 76 and AC bypass 78 to reach the radio frequency output port 91. Similarly, the 5–30 MHz return signal entering at radio frequency output port 91 is routed through AC bypass 78, the relay 76, and the AC bypass 84 so as to exit the node in the return direction at radio frequency input port 90.

A relay which is suitable for use as the relay 76 of FIG. 3 is the OMRON Model G5Y-154P (catalog No. K37-E3-1).

FIG. 4 illustrates another embodiment of an optoelectronic bridger node which is similar in most respects to the optoelectronic bridger node of FIG. 3 except for the differences which are set forth below. It will be noted that in the node of FIG. 4 the output of the combiner is fed directly to the hybrid amplifier 72 rather than feeding the hybrid amplifier through an equalizer/trim circuit 71. In FIG. 4, the hybrid amplifier has a separate trim adjustment 101 and equalizer 103 which are connected to each other through a selectable Pad 102. This separation of the trim and equalizer adjustments provide more flexibility for triauning the frequency response of the system to eliminate minor deviations caused by the split band technique of the present invention. The Pad 102 provides means for adjusting the level of the entire 54–550 MHz band prior to its being fed to the diplexer. The equalizer 103 adjusts for tilt in the signal response. Another feature of the optoelectronic bridger node of FIG. 4 is that it includes a transponder 106 which has a capability of monitoring all of the important operating modes of the node by monitoring key analog parameters, including power supply voltages. Each of the test points illustrated in FIG. 4 may provide signals to the transponder 106 indicative of the status of the radio frequency signals at the corresponding test point. This transponder also allows remote control of a relay 108 which can bypass the optical path 85 and return the node to the original radio frequency path 80. In this regard, the transponder may receiver messages from the headend to, for example, activate the back up mode by switching to the radio frequency path 80 or to perform tests on the node and to return data back to the headend reporting on these tests.

Referring to FIGS. 5a through 5h there are illustrated a number of radio frequency filters which can be used as the radio frequency filters 60, 61, and 62 of FIGS. 3 and 4. As noted previously, these filters may be selected by the user as appropriate depending upon the manner in which the frequency band of interest is split among the various optical signal links. In preferred embodiments of these filters the components of the filter may be plugged into a standard circuit board. Thus, in certain of the filters below a particular leg of the filter may either be jumpered to ground or may not be used (i.e., no components plugged in).

Figure 5A:
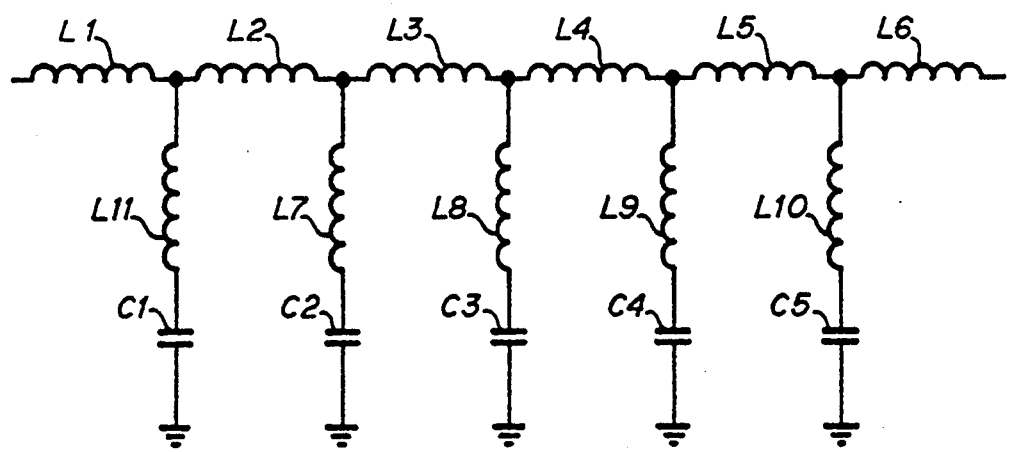
FIGS. 5a through 5h are schematic diagrams of presently preferred filters which are incorporated in the optoelectronic receiver nodes.
Figure 5B:
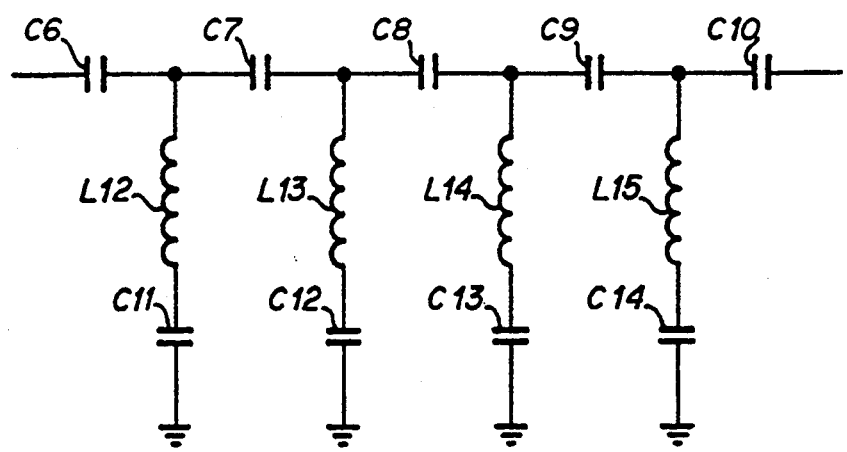
Figure 5C:
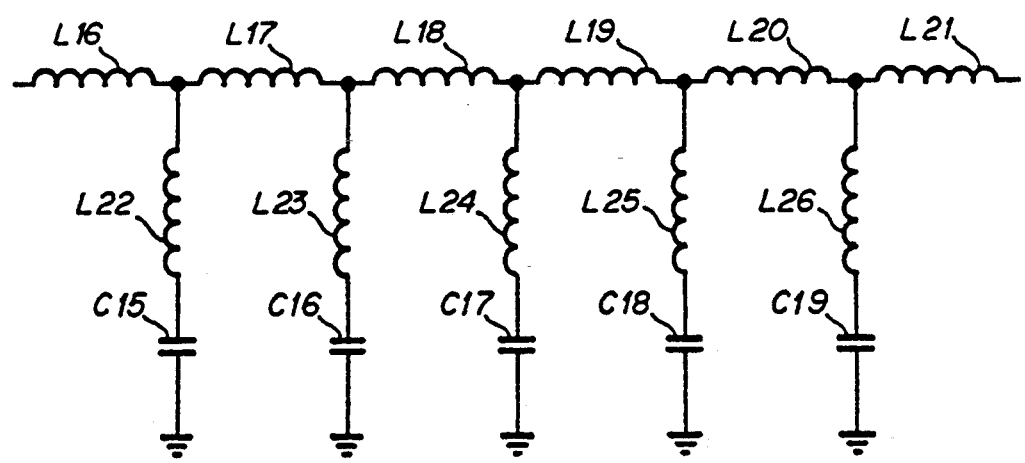
Figure 5D:
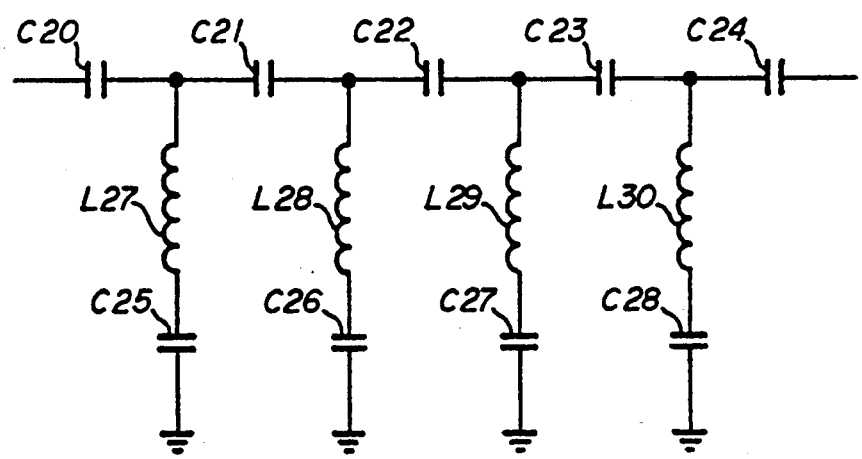
Figure 5E:
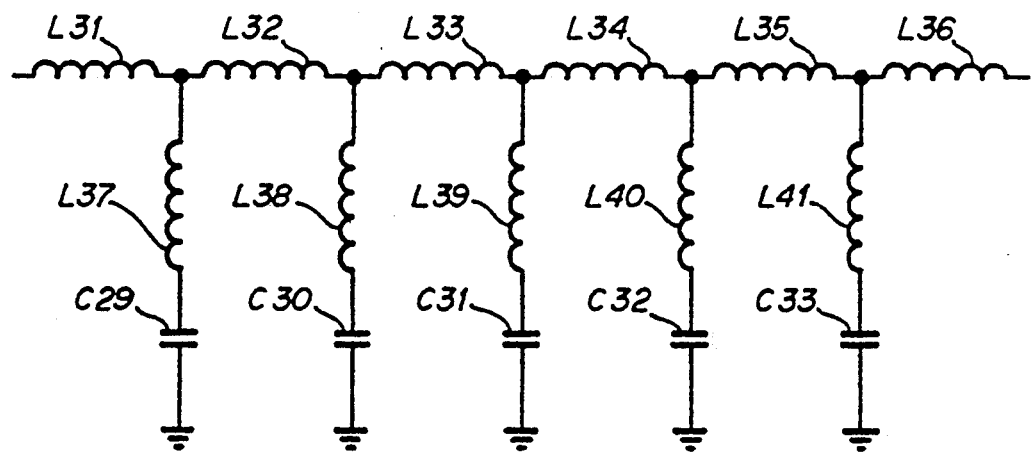
Figure 5F:
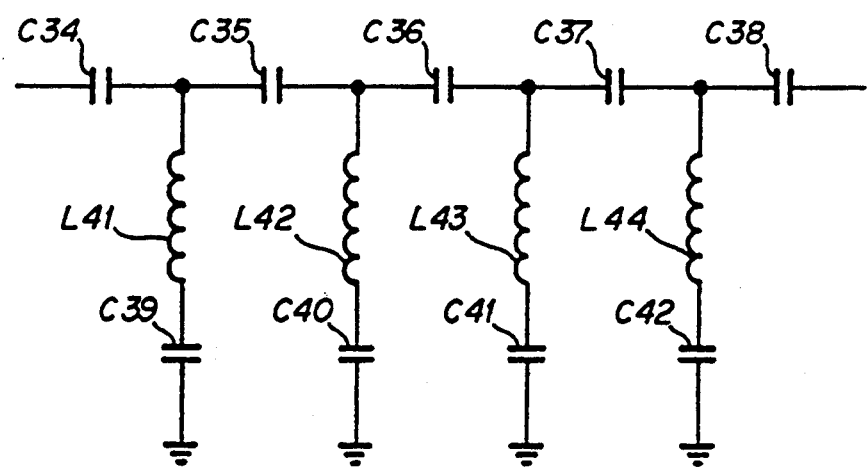

With reference to the figures, FIGS. 5a and 5b represent 330 MHz low pass and high pass filters respectively. FIGS. 5c and 5d represent 270 MHz low pass and high pass respectively. FIGS. 5e and 5f represent 234 MHz low pass and high pass filters respectively.

Figure 5G:
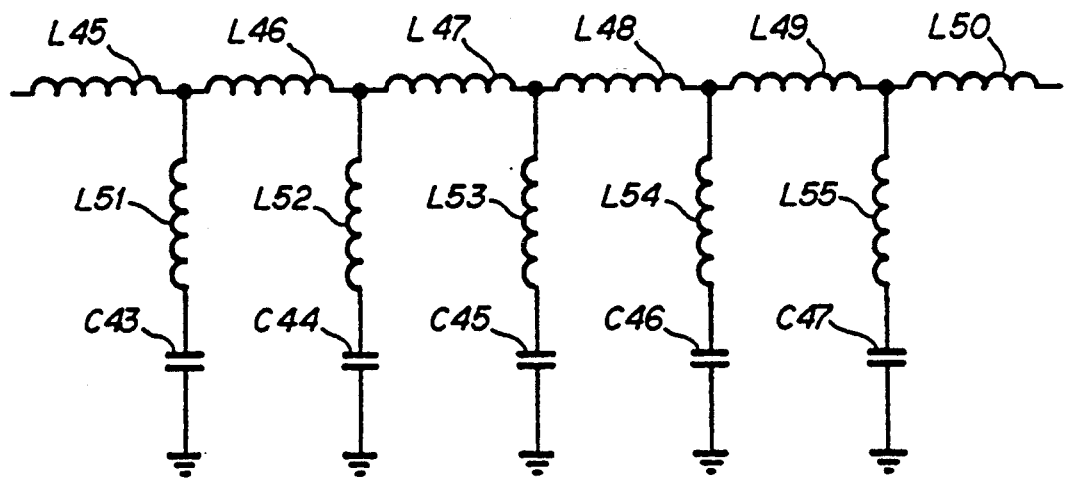
Figure 5H:
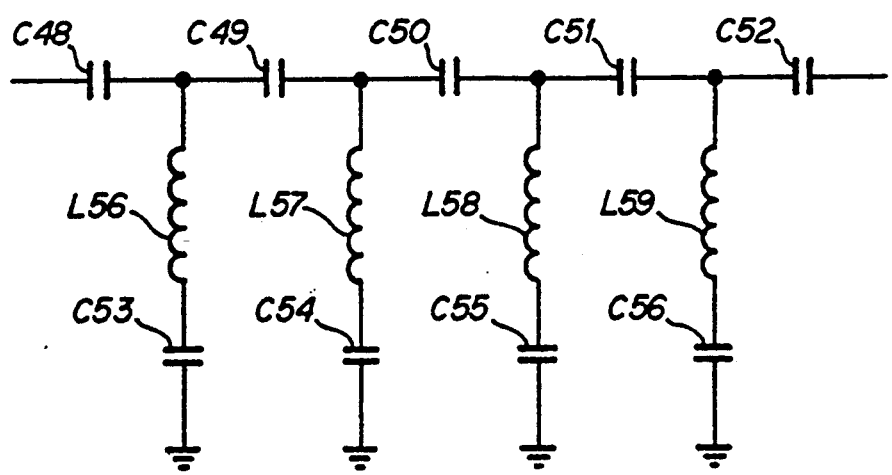

Finally, FIGS. 5g and 5h represent 174 MHz low pass and high pass filters respectively. It will be noted, of course, that various combinations of these high pass and low pass filters may also be used to obtain bandpass characteristics for middle bands when the total frequency band of interest is split into more than two bands.

Figure 6:
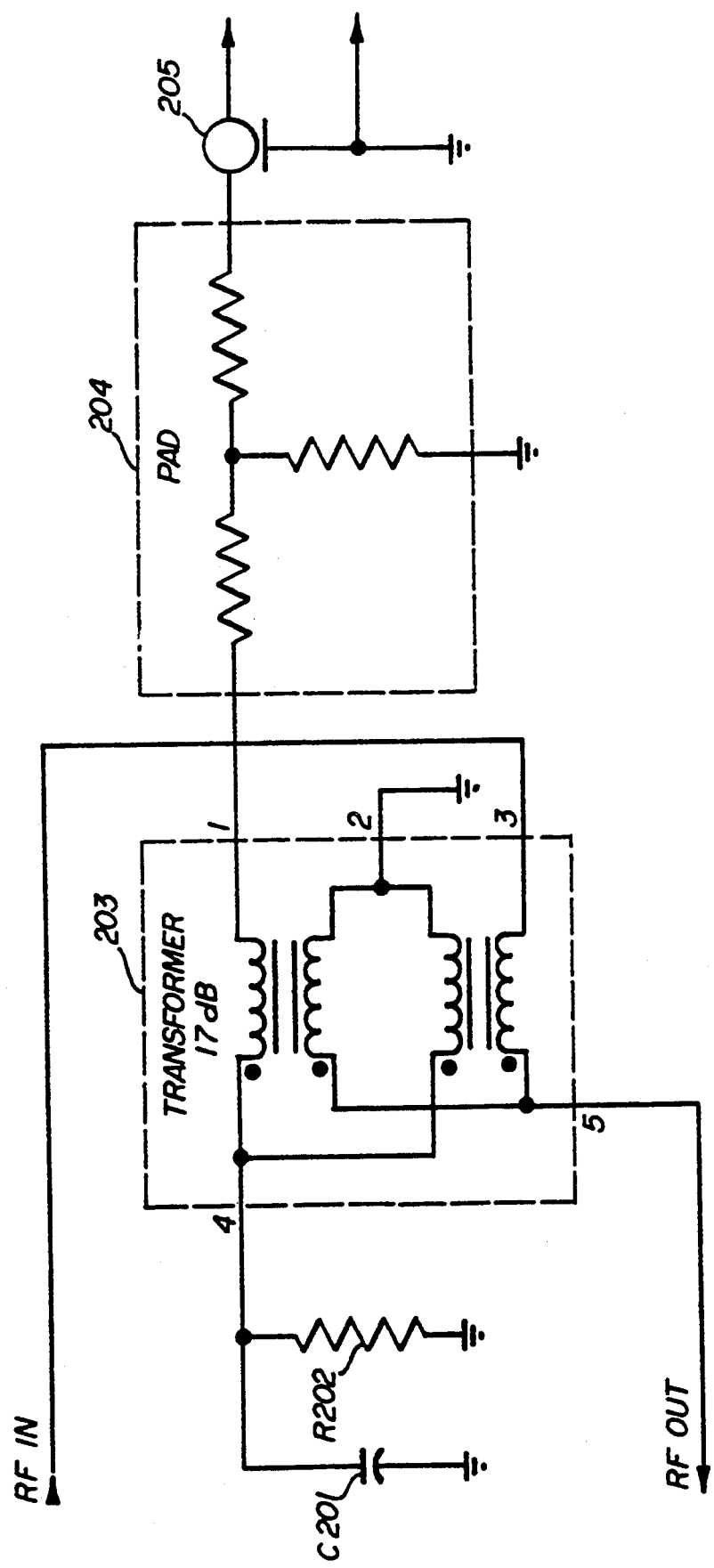
FIG. 6 is a schematic diagram of an illustrative directional coupler which may be incorporated in the receiver nodes of the invention.

FIG. 6 is a schematic diagram of a directional coupler which is the presently preferred embodiment of the test points (e.g., test points 63, 64, and 65 of FIG. 3) which are utilized in the optoelectronic receiver nodes of the present invention. This directional coupler comprises a radio frequency transformer 203 which is adapted for sampling a signal 17 db down from the signal which is applied to the transformer. An radio frequency input signal is applied to terminal 3 of the transformer and exits at terminal 5 where this radio frequency signal is passed on to the next component in the circuitry. A secondary winding of the transformer is connected between terminals 1 and 4. Externally connected to terminal 4 is a resistor 202. This resistor is connected to ground. Also connected to ground from terminal 4 and parallel with resistor 202 is a capacitor 201. Terminal 1 of the transformer is the output which supplies a sample of the radio frequency input signal to a conventional Pad 204 and thence to the physical test point 205.

Figure 7:
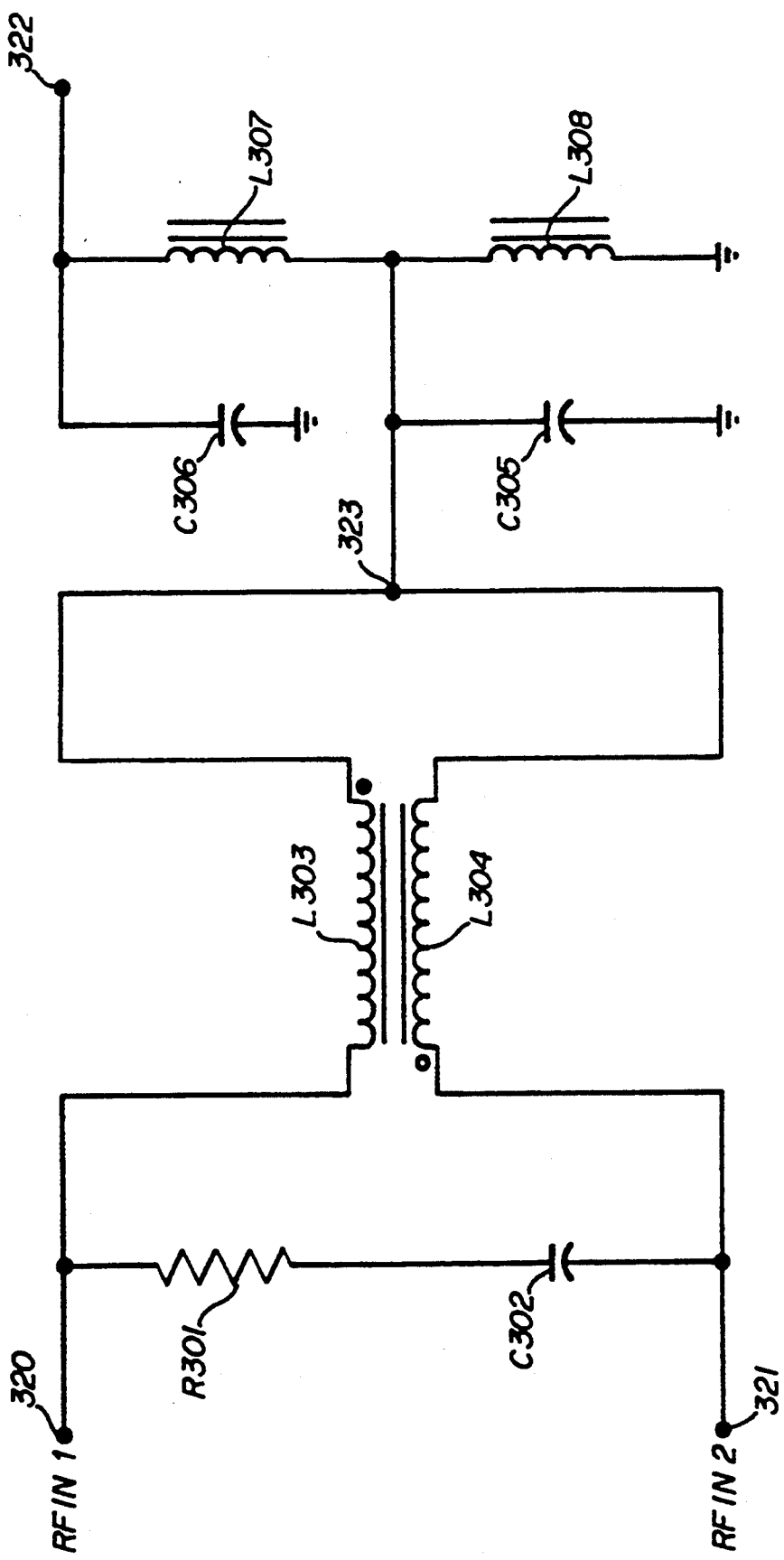
FIG. 7 is a schematic diagram of a combiner which may be incorporated in the receiver node of the invention.

FIG. 7 is a circuit diagram of an radio frequency combiner circuit which may be used, for example, to implement the radio frequency combiners 69 or 70 of FIG. 3. Referring to FIG. 7, the circuit includes a pair of input terminals 320 and 321 which are adapted to be connected to respective radio frequency input signals. A resistor R301 in series with a capacitor 302 are connected across the input terminals 321 and 322. Resistor R301 is connected through a radio frequency choke to a point 323. Capacitor 302 is also connected through a radio frequency choke to a point 323. It will be noted that there is ferrite coupling between the chokes 303 and 304. Point 323 is connected through a capacitor 305 to ground. Point 323 is connected through an radio frequency choke 307 to the output terminal 322. Output terminal 322 is also connected through a capacitor 306 to ground. Point 323 is further connected through an Rf choke to ground.

The above circuit operates in a manner to combine two radio frequency input signals of different frequency bands applied at input terminals 320 and 321 into a single broadband at output terminal 322. This broadband signal constitutes all of the frequency channels contained in both of the input signals.

Referring now to FIG. 8 there is shown a schematic diagram of a presently preferred but nevertheless illustrative embodiment of a circuit which is suitable for use as the diplexer 73 of FIG. 3.

Referring to FIGS. 9a and 9b there are shown illustrative schematic diagrams of trim circuits which may be used for smoothing out the outputs of the combiners of FIGS. 3 and 4. FIG. 9a illustrates a trim circuit which is applicable to systems in which the frequency band of interest is split into two sub-bands for transmission over two optical links. The circuit diagram of FIG. 9b is illustrative of a trim circuit which may be particularly useful for systems in which the band of interest has been split into three sub-bands for transmission over three optical links and then recombined.

It will be apparent that there has been described above several preferred but nevertheless, illustrative embodiments of apparatus for transmitting broadband amplitude modulated radio frequency signals over optical links and receiving such signals. Methods have also been described for utilizing the illustrative apparatus for transmitting the signals in a manner which maximizes the signal to noise ratio of the signals while minimizing distortion introduced by the apparatus. Variations and modifications of the apparatus described above within the scope of the invention will undoubtedly suggest themselves to those skilled in the art. Accordingly, the foregoing description should be taken as merely illustrative.

We claim:

1. In a system for communicating information signals with a plurality of optical signals, each of which being modulated with a plurality of carrier signals, a method of receiving said optical signals comprising the steps of:
   demodulating each of said optical signals into its respective carrier signals, wherein a frequency of one of said carrier signals is substantially equal to a frequency of another of said carrier signals; and
   converting the frequency of the one carrier signal to a frequency different than that of the another carrier signal to thereby produce carrier signals having different frequencies.

2. The method of claim 1, wherein said carrier signals having different frequencies have a bandwidth greater than one octave.

3. The method of claim 2, wherein the carrier signals demodulated from each optical signal have a bandwidth of less than one octave.

4. A method for receiving a plurality of optical signals, each of which is modulated with at least one modulated radio frequency carrier signal, said method comprising the steps of:
   demodulating each optical signal into its respective modulated radio frequency carrier signals, wherein at least one of said modulated radio frequency carrier signals has a frequency band that overlaps with another of said modulated radio frequency carrier signals;
   converting the at least one of said modulated radio frequency carrier signals to a different frequency band of carrier signals which does not overlap with any other modulated radio frequency carrier signal modulating said optical signals; and
   combining the resulting modulated radio frequency carrier signals in a single signal path.

5. The method of claim 4 wherein said different frequency band is a lower frequency band.

6. The method of claim 5 further comprising the step of receiving the plurality of optical signals on a plurality of optical fibers.

7. The method of claim 6 wherein each optical signal is modulated with a plurality of modulated radio frequency carrier signals.

8. The method of claim 7, wherein:
   a first group of said plurality of modulated radio frequency carrier signals modulates the optical signal received on a first optical fiber of said plurality of optical fibers, and a second group of said plurality of modulated radio frequency carrier signals modulates the optical signal received on a second optical fiber, said first group of modulated radio frequency carrier signals having the same frequency band as said second group of modulated radio frequency carrier signals; and
   said step of converting comprises converting each of the first group of modulated radio frequency carrier signals to a different frequency band as the second group of modulated radio frequency carrier signals.

9. The method of claim 7 wherein the plurality of modulated radio frequency carrier signals modulating the optical signal received on each optical fiber have a bandwidth of less than an octave.

10. The method of claim 9 wherein the plurality of modulated radio frequency carrier signals modulating the optical signal received on each optical fiber have a bandwidth of about 300-550 MHz.

11. The method of claim 9, wherein said combined modulated radio frequency carrier signals have a bandwidth of greater than one octave.

12. The method of claim 7 wherein n optical signals are received on n optical fibers and said step of converting comprises converting the modulated radio frequency carrier signals received from n−1 of said optical fibers to a different frequency band of carrier signals which does not overlap with any other radio frequency carrier signal modulating said optical signals or any other converted modulated radio frequency carrier signal.

* * * * *

UNITED STATES PATENT AND TRADEMARK OFFICE
CERTIFICATE OF CORRECTION

PATENT NO. : 5,379,141
DATED : January 3, 1995
INVENTOR(S) : Leo Thompson, et. al.

It is certified that error appears in the above-indentified patent and that said Letters Patent is hereby corrected as shown below:

Title page, item [73] assignee: the word "Norcorss" should read --Norcross--

Signed and Sealed this

First Day of August, 1995

Attest:

Attesting Officer

BRUCE LEHMAN

Commissioner of Patents and Trademarks